United States Patent
Li et al.

(10) Patent No.: US 12,554,247 B2
(45) Date of Patent: Feb. 17, 2026

(54) ONLINE OPTIMAL CONTROL UNDER CONSTRAINTS

(71) Applicant: International Business Machines Corporation, Armonk, NY (US)

(72) Inventors: Yingying Li, Cambridge, MA (US); Subhro Das, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 1189 days.

(21) Appl. No.: 17/386,589

(22) Filed: Jul. 28, 2021

(65) Prior Publication Data

US 2023/0043276 A1 Feb. 9, 2023

(51) Int. Cl.
- G06F 16/903 (2019.01)
- G05B 19/4155 (2006.01)
- G06N 5/00 (2023.01)
- G06N 20/00 (2019.01)

(52) U.S. Cl.
CPC ....... *G05B 19/4155* (2013.01); *G06F 16/903* (2019.01); *G06N 5/00* (2013.01); *G06N 20/00* (2019.01); *G05B 2219/50333* (2013.01)

(58) Field of Classification Search
CPC .... G05B 19/4155; G06F 16/903; G06N 5/00; G06N 20/00
See application file for complete search history.

(56) References Cited

U.S. PATENT DOCUMENTS

| | | | |
|---|---|---|---|
| 6,529,795 B1 * | 3/2003 | Friedrich | G05B 19/408 700/186 |
| 7,451,004 B2 * | 11/2008 | Thiele | G05B 13/048 700/28 |
| 8,831,877 B2 | 9/2014 | Anguelov | |
| 10,571,142 B2 | 2/2020 | Buda | |
| 10,839,302 B2 | 11/2020 | Wright | |

(Continued)

FOREIGN PATENT DOCUMENTS

| | | |
|---|---|---|
| EP | 3104248 A1 | 12/2016 |
| JP | 6008898 B2 | 10/2016 |

OTHER PUBLICATIONS

Li et al.; Online Optimal Control with Affine Constraints; Oct. 2020; eprint arXiv:2020.04891; pp. 1-20 (Year: 2020).*

(Continued)

*Primary Examiner* — Phenuel S Salomon
(74) *Attorney, Agent, or Firm* — Joseph P. Curcuru

(57) ABSTRACT

Embodiments of the present invention provide computer-implemented methods, computer program products and computer systems. Embodiments of the present invention can identify a plurality of constraints on states of data and actions of data associated with a data model. Embodiments of the present invention can then identify constraints on safety policy parameters associated with a computing device. Embodiments of the present invention can then convert the identified constraints into a uniform domain syntax that considers coupled and decoupled constraints and introduce buffer data within the converted constraints, wherein the buffer data filters outlier constraints within the plurality of constraints. Embodiments of the present invention can then dynamically generate optimal safety policies associated with the computing device based on the remaining constraints.

20 Claims, 4 Drawing Sheets

(56) References Cited

U.S. PATENT DOCUMENTS

| | | | | |
|---|---|---|---|---|
| 2010/0257505 | A1* | 10/2010 | Hinchey | G06F 8/10 |
| | | | | 717/106 |
| 2015/0293512 | A1* | 10/2015 | Egge | G06F 16/212 |
| | | | | 703/2 |
| 2017/0060104 | A1* | 3/2017 | Genma | G05B 13/0265 |
| 2017/0139411 | A1 | 5/2017 | Hartung | |
| 2019/0196417 | A1* | 6/2019 | Uno | G06N 3/08 |
| 2019/0228309 | A1* | 7/2019 | Yu | G05B 13/048 |
| 2020/0285209 | A1 | 9/2020 | Chakrabarty | |
| 2021/0049501 | A1* | 2/2021 | Kalabic | G05B 19/406 |
| 2022/0026871 | A1* | 1/2022 | Chakrabarty | G05B 19/19 |
| 2023/0043276 | A1* | 2/2023 | Li | G06N 5/00 |

OTHER PUBLICATIONS

"Online Optimal Control with Affine Constraints", Copyright 2021, Association for the Advancement of Artificial Intelligence, 20 pages.

Agarwal et al., "Online Control with Adversarial Disturbances", Proceedings of the 36th International Conference on Machine Learning 2019, 9 pages.

Cohen et al., "Online Linear Quadratic Control", Proceedings of the 35th International Conference on Machine Learning, 2018, 10 pages.

Drgona, et al., "Differentiable Predictive Control: An MPC Alternative for Unknown Nonlinear Systems using Constrained Deep Learning," arXiv:2011.03699v1 [eess.SY] Nov. 7, 2020, 13 pages.

El Chamie, et al., "Controlled Markov Processes with Safety State Constraints," IEEE Transactions on Automatic Control, 2018 IEEE, DOI 10.1109/TAC.2018.2849556, 16 pages.

Foster et al., "Logarithmic Regret for Adversarial Online Control", Proceedings of the 37th International Conference on Machine Learning, 2020, 11 pages.

Goel et al., "The Power of Linear Controllers in LQR Control", arXiv:2002.02574v1 [math.OC] Feb. 7, 2020, 13 pages.

Li et al., "Online Optimal Control with Affine Constraints", arXiv:2010.04891v1 [eess.SY] Oct. 10, 2020, 25 pages.

Nonhoff et al., "An online convex optimization algorithm for controlling linear systems with state and input constraints", arXiv:2002.11308v3 [math.OC] Oct. 19, 2020, 8 pages.

Papusha, et al., "Automata Theory Meets Approximate Dynamic Programming: Optimal Control with Temporal Logic Constraints," 2016 IEEE 55th Conference on Decision and Control (CDC), IEEE, 2016, 7 pages.

* cited by examiner

ONLINE OPTIMAL CONTROL UNDER CONSTRAINTS

BACKGROUND

The present invention relates generally to the field of data safety technology, and more specifically safe algorithm design technology.

Generally, a control system manages, commands, directs, or regulates the behavior of other devices or systems using control loops. Typical control systems can range from a single home heating controller using a thermostat controlling a domestic boiler to large industrial control systems that are used for controlling processes or machines. Certain control systems can provide continuously modulated control using a feedback controller to automatically control a process or operation. In this instance, the control system compares the value or status of the process variable being controlled with the desired value (i.e., setpoint) and applies the difference as a control signal to bring the process variable output of the plant to the same value as the setpoint. In other instances, control systems can provide sequential and combination logic using a programmable logic controller.

SUMMARY

According to an aspect of the present invention, there is provided a computer-implemented method. The computer implemented method comprises: identifying a plurality of constraints on states of data and actions of data associated with a data model; identifying constraints on safety policy parameters associated with a computing device; converting the identified constraints into a uniform domain syntax that considers coupled and decoupled constraints; introducing buffer data within the converted constraints, wherein the buffer data filters outlier constraints within the plurality of constraints; and dynamically generating optimal safety policies associated with the computing device based on the remaining constraints

BRIEF DESCRIPTION OF THE DRAWINGS

Preferred embodiments of the present invention will now be described, by way of example only, with reference to the following drawings, in which.

DETAILED DESCRIPTION

Figure 1:
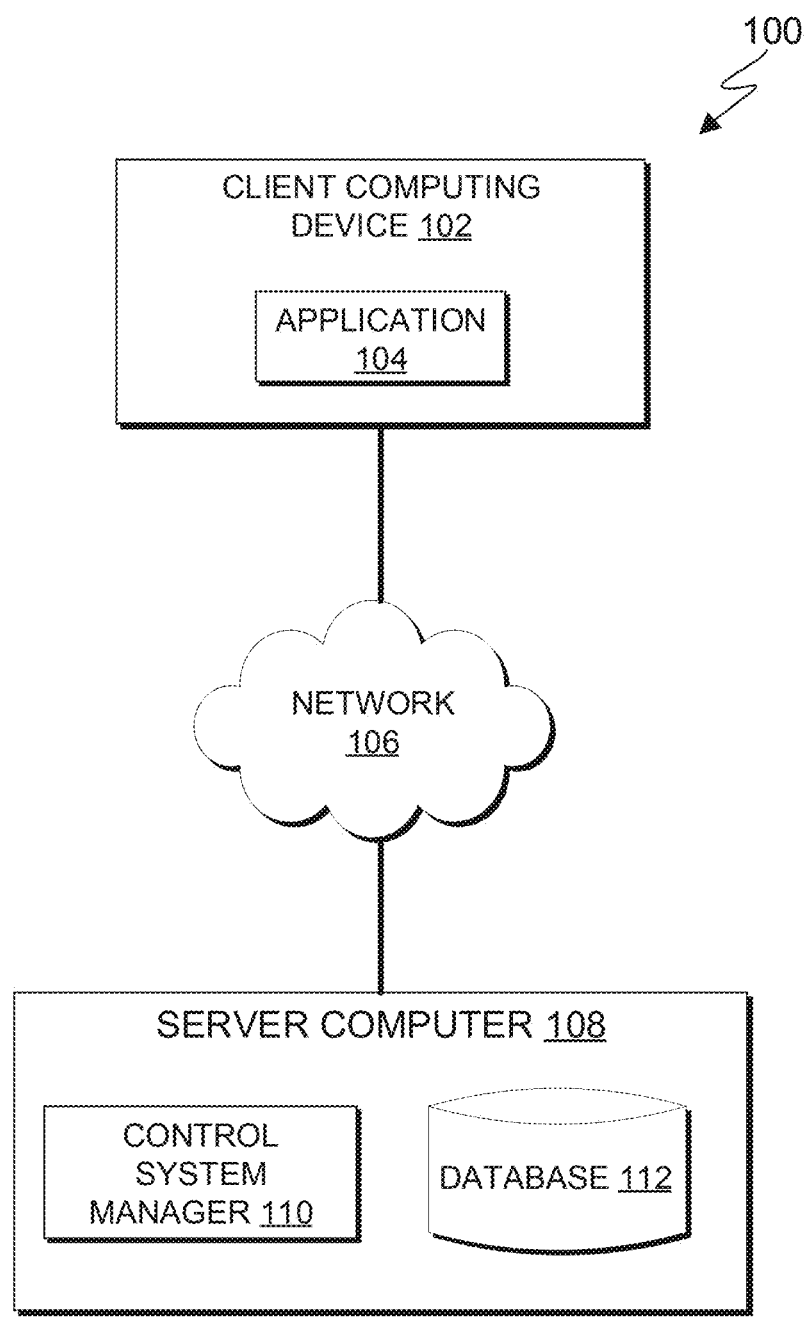
FIG. 1 depicts a block diagram of a computing environment, in accordance with an embodiment of the present invention.

Embodiments of the present invention recognize certain problems with current control systems. Specifically, embodiments of the present invention recognize that current control systems may be too restrictive and cannot adapt to time varying environments for desirable performance. For example, safe reinforcement learning control systems that learn optimal policies without violating constrains and knowing the system require time invariant environment and generally lacks policy regret analysis when facing time varying objects. While online convex optimization (OCO) can consider both coupled and decoupled constraints, embodiments of the present invention recognize that OCO does not consider dynamic systems and cannot consider system disturbances. Embodiments of the present invention further recognize problems with constrained optimal control, that is, without disturbances, optimal controller for linearly constrained (e.g., linear-quadratic regular (LQR algorithm)) is piecewise linear and linear policies may not be optimal for constrained optimal control with disturbances. In other words, embodiments of the present invention recognize that current safety algorithms used in control systems sacrifice optimal performance for safety because these systems lack an analysis for varying cost while satisfying any safety constraint associated with the computing device and the environment.

Constraints, as used herein, refer to operating protocols of a device or system. In certain circumstances constraints may be interpreted as requirements or tasks the device must perform. Constraints may be designed as protocols to achieve a certain outcome (e.g., safety). For example, safety requirements can include feasible actions, safe states, etc. In other embodiments, constraints may be physical in nature. In one example, a constraint for a data center could specify that temperatures of a data center should be maintained within a certain range to reduce task failures despite possible disturbances from external heat sources. In another example, where an unmanned aerial vehicle (e.g., drone) is used, a constraint could require quadrotors of the aerial vehicle should avoid collision with obstacles even when perturbed by wind. In some circumstances, constraints can be used in applications involving time varying environments (e.g., varying electricity prices and moving targets).

One or more actions or events that could interfere with or otherwise prevent execution of protocols or requirements are referred to as "disturbances". For example, with respect to a data center constraint requiring temperature to be maintained within a certain range, a disturbance can be any external or internal heat source that could cause an increase or decrease such that the temperature of the data center rise or fall above or below the required temperature range.

As used herein, a "state" can refer to current operating protocols or performance of one or more actions that attempts to satisfy or satisfies a given constraint. A state can also refer to performance of one or more actions that do not satisfy, violate, or potentially violates a given constraint. An action can therefore refer to a series of movements, protocols, execution of code that either results in the performance of a function that either satisfies or does not satisfy a constraint.

Embodiments of the present invention provide solutions for optimizing performance by minimizing the sum of adversarial varying costs while satisfying constraints (e.g., safety or otherwise) despite any disturbances. Specifically, embodiments of the present invention first convert a constrained online optimal control problem to an Online Convex Optimization (OCO) problem with temporal-coupled stage costs and temporal-coupled stage constraints, and then converts the temporal-coupled OCO problem to a classical OCO problem. Embodiments of the present invention leverage the techniques from recent unconstrained online control literature and robust optimization literature. Since the conversion is not exact/equivalent, the constraint set is tightened by adding buffer zones to account for approximation errors caused by the problem conversion. Embodiments of the present invention can then apply classical OCO algorithms such as Online Gradient Descent (OGD) to generate optimal policies for the control system. Put another way, embodiments of the present invention optimize performance while minimizing costs and satisfying constraints by identifying constraints on approximate states and actions associated with a data model, identifying constraints on safety policy parameters associated with a computing device; converting the identified constraints into a uniform domain syntax that considers coupled and decoupled constraints, introducing buffer data within the converted constraints that filters outlier constraints within the plurality of constraints, and dynamically generating optimal safety policies associated with the computing device based on the remaining constraints as discussed in greater detail later in this Specification.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 4.

In this embodiment, client computing device 102 is a user device associated with a user and includes application 104. Application 104 communicates with server computer 108 to access control system manager 110 (e.g., using TCP/IP) to access constraint information. In certain other embodiments, application 104 can also access or otherwise receive disturbance information. Application 104 can further communicate with control system manager 110 to generate an optimal control policy that simultaneously minimizes the sum of adversarial varying costs and satisfy constraints despite disturbances.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts control system manager 110 and database 112. In this embodiment, control system manager 110 resides on server computer 108. In other embodiments, control system manager 110 can have an instance of the program (not shown) stored locally on client computer device 102. In other embodiments, control system manager 110 can be a standalone program or system that can. In yet other embodiments, control system manager 110 can be stored on any number or computing devices.

In certain other embodiments, control system manager 110 can include an agent (not shown) that interacts with an environment that senses or otherwise receives feedback and take action. This agent can communicate or otherwise interact with a system identification module (not shown) that estimates underlying dynamics and provides a model of the environment (e.g., an approximate estimate of the dynamics and would incur approximation errors). In circumstances, control system manager 110 can access or otherwise be provided with a system dynamics model. In these circumstances, control system manager 110 would not need a system identification module and there would be no need for an error to be accounted for.

In certain embodiments, control system manager 110 can also include or otherwise interact with a safety translation module (not shown) which can receive or otherwise access safety requirements of both the environment and the agent as provided by a domain expert. This safety translation module translates these requirements into system constraints on the states and actions.

In these embodiments, control system manager 110 can also include a policy configuration module (not shown) that generates a class of safe policies in real time. This policy configuration module can receive input in the form of constraints on the states and actions, the estimated model with confidence bounds on the estimation, and a parameterization of admissible control policies. The policy configuration module can generate a class of safety policies specified by the constraints on the control policy parameters. This policy configuration module generates a safety policy that, during implementation of the policy, all the state and action constraints are satisfied despite system disturbances and/or model inaccuracy.

The policy configuration module generates safety policies by introducing approximate states and actions that only depend on a few stages of history policies and provide upper bounds on approximation errors. The policy configuration module can then impose constraints on the approximate states and action which are naturally translated to constraints on the history policies. In these embodiments, the policy configure module can add buffer zones to the constrained set (i.e., having a shrinking effect on the constraint set) of policies to allow for approximation errors and model estimated errors, where the sizes of the buffer zones are determined by the confidence bounds of the estimated model and the upper bounds of the approximation errors. In certain other embodiments the policy configuration module can generate differ types of sub modules for calculating buffer zones, as described in later detail later in this Specification.

In certain embodiments control system manager 110 can further include an optimization module (not shown) that generates an optimal policy based on the safety policy class for the agent (also not shown) to act upon in the environment in order to minimize the overall cost and/or utility function. In a pessimistic/conservative (or adversarial) environment, the optimization module can generate feasible and optimal action before the cost function is revealed. In some time varying environments, the optimization module can run a parallel subroutine to the model and forecast the cost function, which can then be utilized by the optimization module.

In this embodiment, control system manager 110 generates an optimal control policy that simultaneously minimizes the sum of adversarial varying costs and satisfy constraints despite disturbances by computing a feasibly policy class, computing a safety policy class, and utilizing an optimization tool as described in greater detail below.

Figure 2:
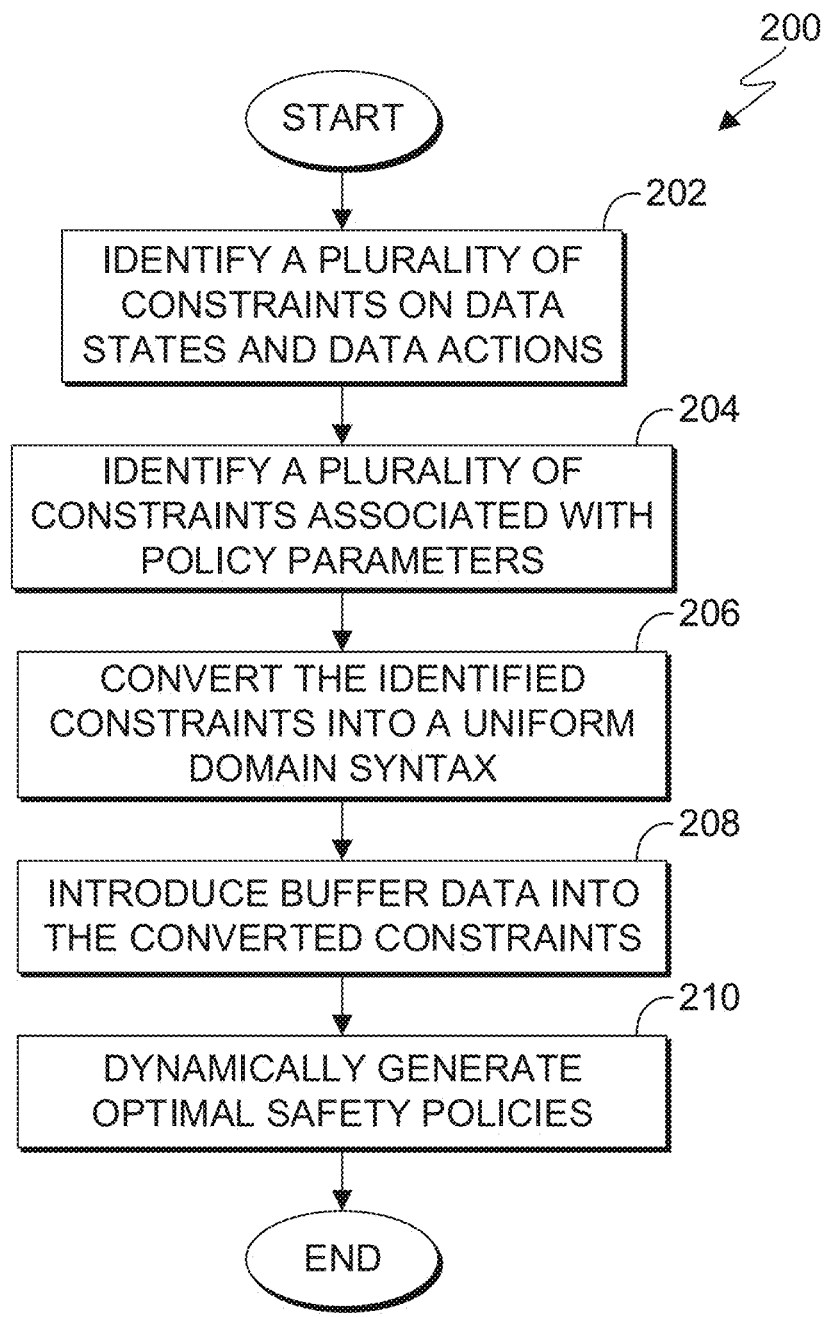
FIG. 2 is a flowchart illustrating operational steps for dynamically generating optimal safety policies, in accordance with at least one embodiment of the present invention.

In this embodiment, control system manager 110 computes a feasibly policy class by identifying constraints on approximate states and actions, identifying constraints on the policy parameters (e.g., temporal-coupled) and accounts for slow variation of online policies (e.g., temporal-decoupled as is the case when there are time-varying actions in the policy set that changes slowly with time) as described in greater detail in FIG. 2. For example, consider the following time-varying function, g on variable mt, where t is the time index expressed as Function 1:

$$g(m_t, m_{t+1}, m_{t+2}) = 10|2m_t - m_{t+1}| + |m_{t+1} - 2m_{t+2}|$$

An example of temporal coupled constrained on Function 1 could be expressed as Function 2:

$$g(m_t, m_{t+1}, m_{t+2}) \leq 2$$

Embodiments of the present invention recognize the a challenge with temporal coupled constraints is that future constraints can be unintentionally violated even if current constraints are satisfied as shown in the Example below:

$$g(m_1, m_2, m_3) = 10|2m_1 - m_2| + |m_2 - 2m_3| \leq 2, \quad (A)$$

$$g(m_2, m_3, m_4) = 10|2m_2 - m_3| + |m_3 - 2m_4| \leq 2, \quad (B)$$

$m_1 = 1$, $m_2 = 2$, $m_3 = 2$ satisfy (A), but there is no $m_4$ to satisfy (B)

In this embodiment, control system manager 110 computes a safety policy class by providing bounds on estimation and approximation errors (e.g., the bounds of the estimate provide the upper limit of the policy regret which means the maximum difference in reward for this online policy compared to an optimal policy in hindsight) computing the error bounds on the approximate states and actions. For example, a constraint can be that current data center temperatures need to be maintained. In this example, the approximate state thus refers to the current temperature and the action taken is the system attempting to regulate the temperature.

Control system manager 110 can then add buffer zones to a feasible policy class. In this embodiment, buffer data can be considered to be input data that slows variation within the conversion of identified constraints which accounts for approximation errors caused by the conversion. For example, based on safety standards, control system manager 110 can receive a constraint that specifies that a robot needs to maintain at least one foot distance from any obstacle. In this scenario, adding a buffer zone can mean that, for its operation (e.g., the robot), control system manager 110 considers the safety distance to be one foot and two inches, wherein the two inches is the buffer zone.

A feasible policy class as used herein refers to a set of actions that are feasible for an agent to take in the environment under consideration. For example, a car can move in one of four directions: front (e.g., forward), back (e.g., reverse), left, or right. The feasible policy class will consist of these four movements (e.g., actions). A car cannot move vertically up or down, so these two actions (e.g., movements) will not be in the feasible policy class.

In this embodiment, control system manager 110 uses an optimization tool to convert the problem to OCO with memory. For example, control system manager 110 can use the following methodology to perform this function: a) perform online optimal control with constraints, b) perform online convex optimization with coupled costs and constraints, c) perform classical online convex optimization, and d) utilize online control algorithms. For example, with respect to a) control system manager 110 can use the following to generate online optimal control with constraints:

$$\min_{u_0,\ldots u_t} \sum_{t=0}^{T} C(x_t, u_t), ut) \qquad \text{a)}$$

subject to $x_{t+1} = Ax_t + Bu_t + w_t$, $D_x D_t \leq d_x$, $D_u U_t \leq d_u$ where $\|w_t\|_\infty \leq \overline{W}$ Control system manager 110 can then perform online convex optimization with coupled costs and constraints using:

$$\min_{\overrightarrow{M_0}\ldots \overrightarrow{M_t}} \sum_{t=0}^{T} f_t\left(\overrightarrow{M_{t-H}}, \ldots, \overrightarrow{M_t}\right) \qquad \text{b)}$$

subject to: $g_{u(M_{t-H}\ldots M_t)} \leq d_u - \varepsilon_1$, $g_{x(M_{t-H+1}\ldots M_t)} \leq d_u - \varepsilon_1$ Control system manager 110 can then perform classical online convex optimization using the following:

$$\min_{\overrightarrow{M_0}\ldots \overrightarrow{M_t}} \sum_{t=0}^{T} \hat{f}_t(\overrightarrow{M_t}) \qquad \text{c)}$$

subject to $\hat{g}_u(\overrightarrow{M_t}) \leq d_u - \varepsilon_1 - \varepsilon_2$, $\hat{g}_x(\overrightarrow{M_t}) \leq d_x - \varepsilon_1 - \varepsilon_2$, Finally, control system manager 110 can then apply classical OCO algorithms such as online gradient descent (OGD), online non-convex gradient (ONG), online minor descent (OMD), follow the perturbed leader (FTPL), etc.

Database 112 stores received information and can be representative of one or more databases that give permissioned access to control system manager 110 or publicly available databases. For example, database 112 can store one or more constraints, safety policies, safety policy classes, etc. In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

FIG. 2 is a flowchart 200 illustrating operational steps for dynamically generating optimal safety policies, in accordance with at least one embodiment of the present invention.

In step 202, control system manager 110 identifies a plurality of constraints of one or more states of data and one or more actions associated with a data model. In this embodiment, control system manager 110 identifies the plurality of constraints of the one or more states of data by performing a query on an external data source for current states of data (e.g., one or more current actions), constraints, and in some embodiments query an external data source for optimal performance that satisfies the constraints. For example, control system manager 110 identifies a constraint (i.e., i=1 when i is defined as carbon emission limit for an automobile in a specific state) for a safe state of data and a constraint for a feasible action (i.e., k is greater than i, when k is defined as the reduction of gas output to ensure that the carbon emission does not exceed the limit) of data associated with the estimated data model.

In this embodiment a data model can be actual or estimated. For example, control system manager 110 can receive actual system dynamics data models as a result of the performed query. Accordingly, controller system manager 110 can identify one or more constraints, states, and actions of a system from the actual system data models. In instances where an actual system dynamics model is unknown, control system manager 110 can identify the plurality of constraints associated with one or more states of a system or environment and accompanying actions by generating introducing approximate states and actions for a given environment and system.

As used herein, approximate states and actions typically refer to predicted actions taken to satisfy physical and safety constraints. In certain instances, the approximate states and actions can include certain limits associated with the identified constraints (e.g., a range of acceptable values that satisfy a given constraint). For example, control system manager 110 can generate approximations (where precise values are unknown) for the temperature limit of a Heating Ventilation and Air Conditioning (HVAC) system (e.g., that serve as an approximate state of the system) and the generate approximate values for potential increase and reduction of temperature of the HVAC system (e.g., that serve as an approximate action of the system).

In this embodiment, control system manager 110 can calculate an upper bound (i.e., threshold limits) on the approximation errors associated with the identified states and actions of data. In instances where control system manager 110 receives actual system dynamics model, control system manager 110 would not need to calculate or otherwise account for an error.

In step 204, control system manager 110 identifies a plurality of constraints on safety policy parameters associated with a computing device 102. In this embodiment, control system manager 110 identifies the plurality of constraints on safety policy parameters from received user preferences or from one or more configuration files of a system (e.g., an actual system dynamic model) that can specify either physical or safety parameters. For example, control system manager 110 can identify constraints for a temperature range for optimal operation of a computing device. In this example, control system manager 110 identifies the constraints on the safety policy parameters associated with zone temperature using the following equation:

$$x(t) \in [x_{min}; x_{max}]. \quad\quad 1)$$

In equation 1, control system manager 110 defines x(t) as the zone temperature at a predetermined time (t). In another example, control system manager 110 identifies constraints on physical control input for optimal operation of the computing device 102 by identifying predetermined policy parameters within the control input associated with the performance or function of the computing device 102. In this example, control system manager 110 identifies the constraints on the safety policy parameters associated with physical control inputs using the following equation:

$$u(t) \in [u_{min}; u_{max}]. \quad\quad 2)$$

In equation 2, control system manager 110 defines u(t) as the control input that is related to the operation of the computing device 102.

In another embodiment, control system manager 110 identifies constraints on the safety parameters associated with the computing device 102 by leveraging a system identification model that estimates underlying dynamics and maps a model encompassing a specific system (e.g., computing device, computing system, environment, etc.). In this embodiment, control system manager 110 approximates an estimate of the dynamics and incurs a plurality of errors associated with the approximation using the generated identification model. In this embodiment, control system manager 110 defines underlying dynamics as limits (i.e., constraints) on optimal performance of a particular system. For example, control system manager 110 estimates the maximum miles per hour associated with the engine of the automobile and horsepower associated with the engine of the automobile as the underlying dynamics.

In step 206, control system manager 110 converts the identified constraints into a uniform domain syntax. In this embodiment, control system manager 110 converts the identified constraints into a safety policy configuration, which is uniform domain syntax that allows for application within a different computing device on any external data source. In this embodiment, control system manager 110 converts the identified constraints of the state and action of data and the identified constraints of the safety policy parameters of a particular system by using a safety translation module (e.g., safety translation algorithm) that uses the identified constraints as input data.

In this embodiment, control system manager 110 can then convert the identified constraints (now standardized into a uniform domain syntax) into the generated safety policy configurations in real-time by imposing the identified constraints on the approximate states and actions of data that are dynamically translated as prime constraints on the at least one historical policy using the safety translation algorithm and a policy configuration data model.

In this embodiment, control system manager 110 generates the safety policy configuration by generating a feasible policy class and a safety policy class based on the conversion of the identified constraints. As mentioned above, a "feasible policy class" refers to a set of actions that are feasible for an agent to take in the environment under consideration. For example, a car can move in one of four directions: front (e.g., forward), back (e.g., reverse), left, or right. The feasible policy class will consist of these four movements (e.g., actions). A car cannot move vertically up or down, so these two actions (e.g., movements) will not be in the feasible policy class. A "safety policy class" refers to a set of actions that are safe for an agent to take in the environment under consideration. In the above example, consider that there is no option for right turn in the road and by turning right the car may fall down the mountain. Then the safety policy class will consists of 3 movement actions: forward, reverse, and left.

Specifically, control system manager 110 uses the identified constraints, estimated data model, and a parameterization of the identified safety policy constraints as input data. Control system manager 110 then uses this input data to generate a class of safety policy that satisfies the identified constraints. For example, control system manager 110 converts the input data by acting on retrieved safety policies associated with the state and action of data from an external data source (i.e., an online query) and removing any safety policy of the retrieved safety policies that does not include a predetermined number of matching factors (i.e., removing safety policies associated within the class of safety class (e.g., radiation leakage as a safety class is removed because it does not match constraints of the retrieved safety policies).

In this manner, control system manager 110 can ensure that the identified constraints associated with the state and action of data and the identified constraints associated with the safety policy parameters of the computing device 102 are satisfied despite any data disturbances or inaccuracies with the data model using the conversion of the input data into the generated class of safety policy data. In another embodiment, control system manager 110 converts the input of the data associated with the generated system identification model using a safety translation data model, which details an optimal process and safety policies associated with translating inputs of data to a different syntax.

In this embodiment, control system manager 110 generates a feasible policy class within the generated safety policy configuration by identifying the constraints associated with the approximate state and action data, identifying the temporal-coupled constraints associated with the policy parameters of the computing device 102, and determining the variations associated with the temporal-decoupled online policies.

In this embodiment, control system manager 110 generates the safety policy class within the generated safety policy configuration by identifying the bounds (i.e., limits) on of the approximation errors associated with the estimated data model, identifying the bounds on the approximate states and actions of data based on calculated error, and adding a plurality of buffer zones to the generated feasible policy class.

In another embodiment, control system manager 110 converts the identified constraints into an online convex optimization that considers coupled and decoupled constraints. In this embodiment, online convex optimization is a subfield of mathematical optimization that studies minimizing convex functions over convex, online data sets. In this embodiment, a coupled constraint is actively modified while a system (e.g., the system control manager 110 is optimizing) is preforming a predetermined function. In this embodiment, a decoupled constraint is modified subsequent to the computing device 102 performing the predetermined function. In this embodiment, control system manager 110 converts the identified constraints into the online convex optimization with temporal-coupled stage costs and temporal-coupled stage constraints.

Control system manager 110 can then convert the online convex optimization with the temporal-coupled constraints into an online convex optimization with decoupled constraints. In this way, control system manager 110 can ensure the identified constraints are satisfied by decoupling the constraints from the optimization. This allows control system manager 110 to focus on the constraints rather than the performance of the system control system manager 110 is being task to optimize. Finally, control system manager 110 can then determine that identified constraints are satisfied when the data does not meet or exceed the limit of the identified constraint. For example, control system manager 110 does not consider dynamic systems or system data disturbances as coupled constraints by converting the identified constraints into the online convex optimization with decoupled constraints.

In step 208, control system manager 110 introduces buffer data within the converted constraints. In this embodiment, control system manager 110 adds buffer data to the generated safety policy configuration. Buffer data as used herein refers to data introduced to account for approximation errors and model estimation errors. Control system manager 110 calculates buffer data by confidence bounds of the estimated dynamic model and upper bounds of the approximation errors. In this way, control system manager can utilize the buffer data (e.g., buffer zones) to filter outlier constraints within the plurality of constraints. Stated another way, control system manager 110 adds buffer data in the form of buffer zones to reduce the range of the identified constraints associated with the state and action of data and the safety policy parameters of the system. In this another embodiment, control system manager 110 determines a size of the buffer zone by averaging the confidence bounds of the estimated data model and the approximated upper bounds of identified constraints.

In step 210, control system manager 110 dynamically generates safety policies. In this embodiment, control system manager 110 dynamically generates safety policies based on the remaining constraints. In some embodiments, control system manager 110 can utilize an optimization algorithm to refine the generated safety policies. In this embodiment, control system manager 110 generates the safety policies associated for a respective system by generating a feasible action prior to a calculated cost function. In certain circumstances, control system manager 110 can generate an enhanced or otherwise modified action (e.g., modified action prior to a calculated cost.

In some embodiments, control system manager 110 generates the optimal safety policies by analyzing the generated safety policy configuration, generating a parallel subroutine to the generated safety policy configuration, predicting the cost output of the estimated data model; predicting the utility output of the estimated data model, and validating that the generated safety policy configuration does not meet or exceed the upper bounds of the identified constraints associated with a particular system.

Figure 3:
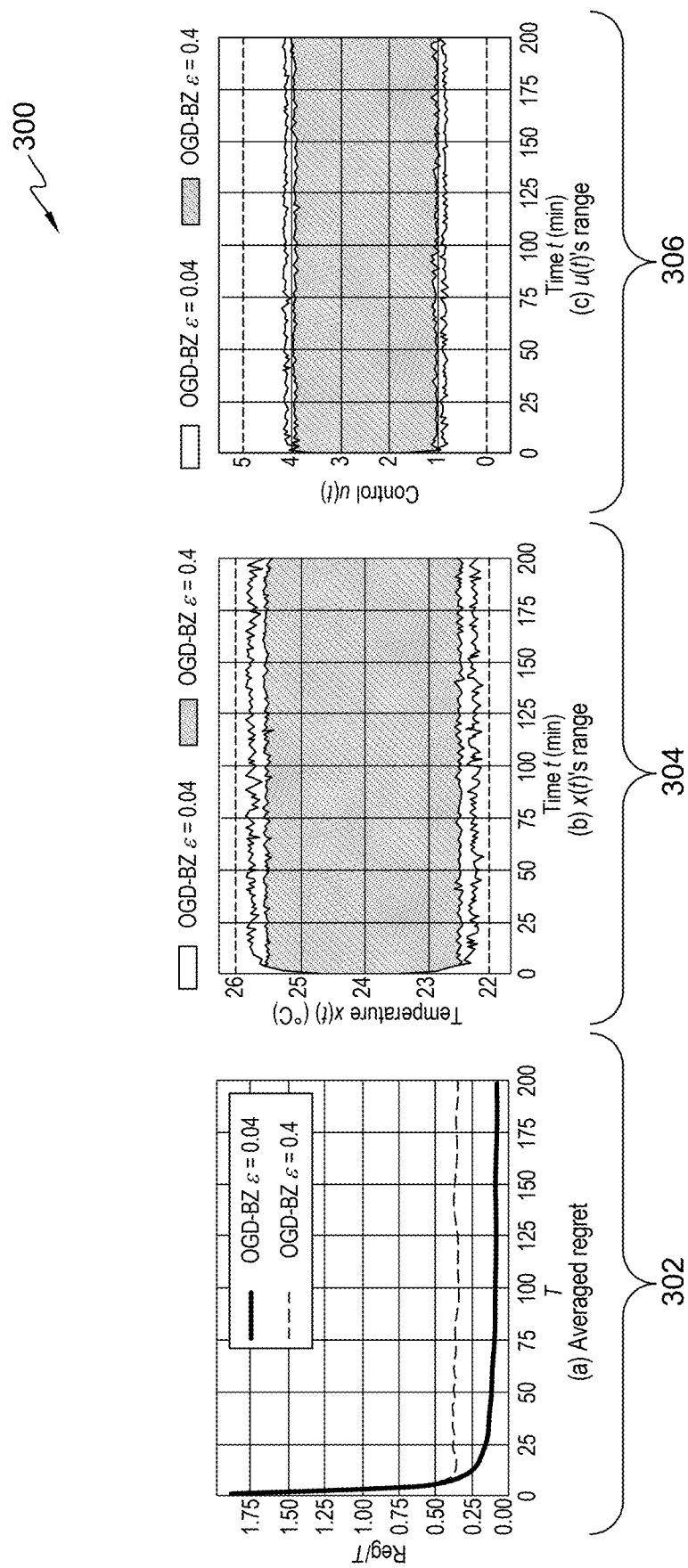
FIG. 3 is a set exemplary graphs detailing the data regret reduction based on the application of a buffer zone within the generated safety policy configuration, in accordance with at least one embodiment of the present invention.

FIG. 3 is a set exemplary graphs 300 detailing the data regret reduction based on the application of a buffer zone within the generated safety policy configuration, in accordance with at least one embodiment of the present invention.

In this example, embodiments of the present invention depict a series of exemplary graphs (e.g., exemplary graphs 300 shown as graphs 302, 304, and 306 respectively) from a case study involving thermal control with an Heating Ventilation and Air Conditioning (HVAC) system. In this example, control system manager 110 manages a single zone HVAC system, where the zone is equipped with a sensor detecting the location temperature and an actuator/controller adjusting the supply air rate. These series of graphs show a comparison of Online Gradient Descent with Buffer Zones (OGD-BZ) with buffer sizes $\varepsilon=0.04$ and $\varepsilon=0.4$ In this example, control system manager 110 can use the following formula to account fo linear thermal dynamics with additional random disturbances:

$$\dot{x}(t) = \frac{1}{\upsilon \zeta}(\theta^\circ(t) - x_i(t)) - \frac{1}{\upsilon}u(t) + \frac{1}{\upsilon}\pi + \frac{1}{\upsilon}w(t), \quad \text{Example Formula 1}$$

$$1 \le i \le N,$$

For human comfort and/or safe operation of device, control system manager 110 identifies constraints on the zone temperature using Example Formula 2: $x(t) \in [x_{min}; x_{max}]$. Control system manager 110 can express the physical constraints on the control inputs using Example Formula 3:

$$u(t) \in [u_{min}; u_{max}].$$

In this example, control system manager 110 can express a constraint (e.g., desirable temperature by users (e.g., $\theta^{set}$) as a cost function expressed by $$c(t) = q_t(x(t) - \theta^{set})^2 + r_t(u(t) - u^{set})^2 \quad \text{Example Formula 4:}$$

In example 302, control system manager 110 displays a linear graph that depicts a reduction of an averaged regret value over time by narrowing the buffer zone associated with the generated safety policy configuration. In this example, control system manager 110 calculates an averaged regret value of 0.375 for a generated safety policy configuration with a buffer zone of ε=0.4. In this example, control system manager 110 calculates the averaged regret value of 0.10 for the generated safety policy configuration in response to narrowing the buffer zone to ε=0.04.

In example 304, control system manager 110 displays a graph depicting a change in the zone temperature constraints over a predetermined period of time based on a reduction in the buffer zone size. In this example, control system manager 110 displays a range for the zone temperature constraints with a minimum of 22° C. and a maximum of 26° C. over 200 minutes associated with the buffer zone to ε=0.04. In this example, control system manager 110 displays the range for the zone temperature constraints with a minimum 22.5° C. and a maximum of 25.5° C. over 200 minutes associated with the buffer zone of ε=0.4.

In example 306, control system manager 110 displays a graph depicting a change in the control input constraints over the predetermined period of time based on the reduction in the buffer zone size. In this example, control system manager 110 displays a range for the physical control input constraints with a minimum value of 0.5 and a maximum value of 4.5 over 200 minutes associated with the buffer zone of ε=0.4. In this example, control system manager 110 displays the narrowed range for the physical control input constraints with a minimum value of 1.1 and a maximum value of 3.9 over 200 minutes associated with the buffer zone of ε=0.04.

FURTHER COMMENTS AND/OR EMBODIMENTS

Some embodiments of the present invention recognize the following facts, potential problems, and/or areas for improvement with respect to the current state of the art.

INTRODUCTION

Some embodiments of the present invention consider solving control problems by levering learning based techniques, e.g., online learning and/or reinforcement learning. This is motivated by various applications, such as data center cooling, robotics, autonomous vehicles, etc. However, some embodiments of the present invention design safe algorithms that guarantee the system to satisfy certain (physical) constraints despite unknown disturbances. For example, the temperatures of a data center should be maintained within certain rand to reduce task failures despite possible disturbances from external heat sources, and quadrotors should avoid collision with obstacles even when perturbed by the wind, etc. In addition to safety, some embodiments of the present invention involve time varying environments, such as varying electricity prices and moving targets. Therefore, the safe algorithm design should not be over-conservative and should adapt to time varying environments for desirable online performance.

Some embodiments of the present invention design safe algorithms for time-varying environments by considering the following constrained online optimal control problem using a linear system with random disturbances:

$$x_{t+1} = Ax_t + Bu_t + w_t, t \ge 0 \quad 3)$$

With respect to equation (3), disturbance $w_t$ is random. Consider affine constrains on the state $x_t$ and the action $u_t$:

$$D_x x_t \le d_x, D_u u_t \le d_u, \forall t \ge 0 \quad 3)$$

Within equation 4, some embodiments of the present invention assume the system parameters A, B, w and the constraints are known. At stage $0 \le t \le T$, a convex cost function $c_t(x_t, u_t)$ is adversarially generated and the decision maker selects a feasible action $u_t$ before $c_t(x_t, u_t)$ is revealed. Some embodiments of the present invention aim to achieve two goals simultaneously: (i) satisfy the constraints (2) for all t despite the disturbances. There is a rich body of work addressing each goal separately but lack results on both goals together as discussed below.

Firstly, there is recent progress on online optimal control to address the goal (i). A commonly adopted performance metric is policy regret, which compares the online cost with the cost of the optimal linear policy in hindsight. Sublinear policy regrets have been achieved for linear systems with either static disturbances or adversarial disturbances. However, some embodiments of the present invention consider the unconstrained control problem.

Secondly, there are many papers from the control community to address goal (ii): constraints satisfaction. Some embodiments of the present invention recognize the Model predictive Control algorithm and its variants such as robust MPC which guarantees constraints satisfaction in the present of disturbances. However, robust MPC tens to sacrifice optimality for safety. Further, there lacks regret/optimality analysis for robust MPC under adversarial varying costs.

Some embodiments of the present invention propose an online control algorithm—Online Gradient Descent with Buffer Zones (OGD-BZ). Some embodiments of the present invention convert the constrained online optimal control problem as an OCO problem with temporal-coupled stage costs and temporal-coupled stage constraints, and then convert the temporal-coupled OCO problem to a classical OCO problem. The problem with conversion leverages the techniques from recent unconstrained online control literature and robust optimization literature. Due to the conversion not being exact or equivalent, some embodiments of the present invention tighten the constraint set by adding buffer zones to account for approximation errors caused by the problem conversion. Then, some embodiments of the present invention apply classical OCO algorithms such as OGD to solve the problem and call the resulting algorithm as OGD-BZ.

Theoretically, some embodiments of the present invention, with proper parameters, can ensure all the states and action to satisfy the constraints within equation 4 for any disturbances bounded by w. Some embodiments of the present invention show that OGD-BZ; s policy regret can be bounded by $O(\sqrt{T})$ for general convex cost functions $c_t(x_t, u_t)$ under proper assumptions and parameters. OGD-BZ is the first algorithm with theoretical guarantees on both sublinear policy regret and robust constraints satisfaction. Some embodiments of the present invention explicitly characterize a trade-off between the constraint's satisfaction and the low regret when deciding the size of the buffer zone of OGD-BZ: a larger buffer zone, which indicates a more conservative search space, is preferred for constrains satisfaction, while a smaller buffer zone is preferred for low regret.

There is a rich body of literature on safe RL and safe learning-based control that studies how to learn optimal policies without violating constraints and without knowing the system. Some embodiments of the present invention propose algorithms to learn optimal linear policies for a constrained linear quadratic regulator problem. However, most theoretical guarantees in the safe RL literature require time-invariant and there lacks policy regret analysis when facing time-varying objectives.

Another important notion of safety is the system stability, which is in the safe RL/learning-based control literature. OCO with memory considers coupled costs and decoupled constraints. Some embodiments of the present invention describe OCO with coupled constraints, where constraint violation is usually allowed, and OCO does not consider dynamical systems, let alone system disturbances. Constrained optimal control enjoys a long history of research. Without disturbances, the optimal controller for linearly constrained LQR is piecewise linear. With disturbances, the problem is much more challenging. Existing approaches, such as robust tube-based MPC, usually sacrifice optimality for feasibility.

PROBLEM FORMULATION

Some embodiments of the present invention consider an online optimal control problem with linear dynamics and affine constraints. Specifically, at each stage t=0, 1, ... T, an agent observes the current state $x_t$ and implements an action $u_t$, which incurs a cost $c_t(x_t, u_t)$. The stage cost function is generated adversarially and revealed to the agent after the action $u_t$ is taken. The system evolves to the next state according to equation 3, where $x_o$ is fixed, $w_t$ is a random disturbance bounded by $w_t \in W=\{w \in \mathbb{R}^n : \|w\|\infty \leq w\}$, and states and action should satisfy the affine constraints of equation 4. Some embodiments of the present invention denote the corresponding constraint sets as $X=\{x \in \mathbb{R}^n : D_x x \leq d_x\}$, $U=\{u \in \mathbb{R}^m : D_u u \leq d_u\}$, where $d_x \in \mathbb{R}^{k_x}$ and $d_u \in \mathbb{R}^{k_u}$. Some embodiments of the present invention considers that the parameters A, B, w, $D_x$, $d_x$, $D_u$, $d_u$ are know a priori, and leave the unknown case for future work.

Some embodiments of the present invention consider a controller A that chooses action $u_t^A$ based on history states $\{x_k^A\}_{k=0}^t$ and cost functions $\{c_k(.,.)\}_{k=0}^{t-1}$. The controller A is called feasible if $x_t^A \in X$ and $u_t^A \in U$ for all $0 \leq t \leq T$ and all disturbances. For a feasible algorithm/controller, the total cost is determined by:

$$J_T(A) = \underset{\{w_k\}}{E} \sum_{t=0}^T c_t(x_t^A, u_t^A) \quad 5)$$

Some embodiments of the present invention consider linear policy of the form $u_t=-Kx_t$ as the benchmark policy for simplicity, though the optimal policy for the constrained control of noisy systems may be nonlinear. A linear controller $u_t=-Kx_t$ is (k, γ) strongly stable for k≥1 and γ∈(0,1] if there exists a matrix L and an invertible matrix H such that $A-BK=H^{-1}LH$, with $\|L\|\leq 1-\gamma$. Some embodiments of the present invention have a benchmark policy class that includes any linear controller $u_t=-Kx_t$ satisfying the condition K={K:K is feasible and (k, γ)–strongly stable}, where K is called feasible if the controller $u_t=-Kx_t$ is feasible. The policy regret of online algorithm A is defined as $$Reg(A)=J_T(A)-\min/(k\in K)J_T(K). \quad 5)$$

Some embodiments of the present invention assume $x_0=0$ for simplicity and define $k_B=\max(\|B\|_2, 1)$. In addition, some embodiments of the present invention assume the disturbances and cost function. These assumptions are $\{w_t\}$ are i.i.d. with $E[w_t]=0$, covariance matrix $\Sigma w$ and bounded range $\|w_t\|\infty \leq w^-$, where $w^->0$. For any t≥0, cost function ct(xt,ut) is convex and differentiable with respect to $x_t$ and $u_t$. Further there exists G>0, such that for any $\|x\|2\leq b$, $\|u\|2\leq b$, we have $\|\nabla x ct(x, u)\mu 2\leq Gb$ and $\|\nabla u ct(x, u)\|2\leq Gb$. A feasible controller A is called ε-strictly feasible for some ε>0 if $D_x x_t^A \leq d_x - \varepsilon 1_{k_x}$, and $D_u u_t^A \leq d_u - \varepsilon 1_{k_u}$ for all 0≤t≤T under any disturbance sequence $\{w_k \in W\}_{k=0}^T$. Some embodiments of the present invention assume that there exists a strictly feasible policy in K, based on the existence of a strictly feasible solution instead of just a feasible solution is usually required in constrained optimization and control theory.

There exists $K^* \in K$ such that the policy $u_t=-K_*x_t$ is $\varepsilon^*$-strictly feasible for some $\varepsilon_*>0$, requires the sets X and U to have non-empty interiors; and that the disturbance set W is small enough so that a disturbed linear system xt+1 k t(k≤H)k(A−BK*)xt+wt stays in the interiors of X and U for any $\{wk \in W\}Tk=0$. Since x0=0, some embodiments of the present invention assume that 0 belongs to the interiors of X and U. Finally, some embodiments of the present invention provide a sufficient condition to verity by solving a convex optimization involving linear matrix inequalities.

PRELIMINARIES

This section reviews the unconstrained online optimal control and robust constrained optimization literature.

Some embodiments of the present invention consider $X=\mathbb{R}^n$ and $U=\mathbb{R}^m$, then the problem reduces to an unconstrained online optimal control. Some embodiments of the present invention propose a disturbance-action policy class to design an online policy. Some embodiments of the present invention ix an arbitrary (κ,γ)-strongly stable matrix K a priori. Given an H∈{1, 2, ..., T}, a disturbance-action policy defines the control policy as:

$$u_t=-Kx_t+\sum_{i=1}^H M^{[i]}w_{t-i}, \forall t\geq 0 \quad 6)$$

In equation 6, $M^{[i]} \in \mathbb{R}^{m\times n}$ and $w_t=0$ for t≤0. Let M= $\{M^{[i]}\}_{i=1}^H$ denote the list of parameter matrices for the disturbance-action policy. In some embodiments of the present invention, K can be computed efficiently by SDP formulation. Further, some embodiments of the present invention introduce a bounded convex constraint set on policy M for technical simplicity and without loss of generality:

$$M_2=\{M=\{M^{[i]}\}_{i=1}^H : \|M^{[i]}\|2\leq \kappa^3 \kappa B(1-\gamma)^i, \forall i\} \quad 7)$$

Some embodiments of the present invention derive the approximations of the states and actions when implementing disturbance-action policies. When implementing a disturbance-action policy with time-varying $M_t = \{M^{[i]}\}^H$ at each stage $t \geq 0$, the states and actions satisfy:

$$x_t = A^H_K x_{t-H} + \tilde{x}_t^- \text{ and } u_t = -KA^H_K x_t - H + \tilde{u}_t^-, \quad 8)$$

where $A_K = A - BK$. The approximate/surrogate state and action, $\tilde{x}_t$ and $\tilde{u}_t$, are defined as:

$$x_t = \sum_{k=1}^{2H} \Phi^x_k(M_{t-H:t-1}) w_{t-k},$$

$$u_t = -Kx_t + \sum_{i=1}^{H} M_t^{[i]} w_{t-i} = \sum_{k=1}^{2H} \Phi^u_k(M_{t-H:t}) w_{t-k},$$

$$\Phi^x_k(M_{t-H:t-1}) = A_K^{k-1} 1_{(k \leq H)} + \sum_{i=1}^{H} A_K^{i-1} BM^{[k-i]}_{t-i} 1_{(1 \leq k-i \leq H)}$$

$$\Phi^u_k(M_{t-H:t}) = M_t^{[k]} 1_{(k \leq H)} - K\Phi^x_k(M_{t-H:t-1}),$$

where $M_{t-H:t} := \{M_{t-H}, \ldots, M_t\}$, the superscript k in $A_K^k$ denotes the kth power of $A_K$, and $M_t^{[k]}$ with superscript [k] denotes the kth matrix in list $M_t$. Further, define $^\circ\Phi^x_k(M) = \Phi^x_k(M, \ldots, M)$, $^\circ\Phi^u_k(M) = \Phi^u_k(M, \ldots, M)$. Notice that $x_t$ and $u_t$ are affine functions of $M_{t-H:t}$. Based on $x_t$ and $u_t$, introduces an approximate cost function:

$$f_t(M_{t-H:t}) = E[c_t(x_t, u_t)], \quad 9)$$

With respect to equation 9, some embodiments of the present invention define the convex with respect to $M_{t-H:t}$ since $x_t$ and $u_t$ are affine functions of $M_{t-H:t}$ and $c_t(\cdot, \cdot)$ is convex.

Some embodiments of the present invention define the unconstrained online optimal control problem as converted to OCO with memory, i.e., at each stage t, the agent selects a policy $M_t \in M_2$ and then incurs a cost $f_t(M_{t-H:t})$. Notice that the cost function at stage t couples the current policy $M_t$ and the H-stage historical policies $M_{t-H:t-1}$, but the constraint set $M_2$ is decoupled and only depends on the current $M_t$. To solve this OCO with memory problem, some embodiments of the present invention define decoupled cost functions:

$$\tilde{f}_t(M_t) := f_t(M_t, \ldots, M_t) \quad 10)$$

With respect to equation 10, some embodiments of the present invention let the H-stage historical policies be identical to the current policy. Notice that $\tilde{f}_t(M_t)$ is still convex. Accordingly, the OCO with memory is reformulated as a classical OCO problem with stage cost $\tilde{f}_t(M_t)$, which is solved by classical OCO algorithms such as online gradient descent. The step sizes of OGD are chosen to be sufficiently small so that the variation between the current policy $M_t$ and the H-stage historical policies $M_{t-H}, \ldots, M_{t-1}$ are sufficiently small, which guarantees small approximation error between $f_t(M_t)$ and $f_t(M_{t-H:t})$, and thus low regrets.

Consider a robust optimization problem with linear constraints:

$$\max_x f(x) \text{ s.t. } a_i^T x \leq b_i, \forall a_i \in C_i, \forall 1 \leq i \leq k \quad 11)$$

With respect to equation 11, some embodiments of the present invention define $C_i = \{a_i = \tilde{a}_i + P_i z : \|z\|_\infty \leq \bar{z}\}$ for any i. Notice that the robust constraint $\{a_i^T x \leq b_i, \forall a_i \in C_i\}$ is equivalent to the standard constraint $\{\sup_{a_i \in C_i} [a_i^T x] \leq b_i\}$. Further, one can derive:

$$\sup_{a_i \in C_i} a_i^T x = \quad 12)$$

$$\sup_{\|z\|_\infty \leq \bar{z}} (\tilde{a}_i + P_i z)^T x = \tilde{a}_i^T x + \sup_{\|z\|_\infty \leq \bar{z}} z^T (P_i^T x + \|P_i^T x\|_1 \bar{z})$$

Therefore, the robust optimization of equation 12 can be equivalently reformulated as the linearly constrained optimization of:

$$\min_x f(x) \text{ s.t. } a_i^T x + \|P_i^T x\|_1 \bar{z} \leq b_i, \forall 1 \leq i \leq k. \quad 13)$$

ONLINE ALGORITHM DESIGN

Some embodiments of the present invention convert the constrained online optimal control to OCO with memory and coupled constraints, which is later converted to classical OCO and solved by OCO algorithms. The conversion leverages the approximation and the reformulation techniques. During the conversion, some embodiments of the present invention ensure that the outputs of the OCO algorithms are feasible for the original control problem. This is achieved by tightening the original constraints (adding buffer zones) to allow for approximation errors. Some embodiments of the present invention ensure small buffer zones and small approximation errors so that the optimality/regret is not sacrificed significantly for feasibility. When applying the disturbance-action policies, some embodiments of the present invention rewrite the state constraint $x_{t+1} \in X$ as:

$$D_x A_K^H x_{t-H+1} + D_x \tilde{x}_{t+1} \leq d_x, \forall \{w_k \in W\}_{k=0}^T \quad 14)$$

With respect to equation 14, $\tilde{x}_{t+1}$ is defined as the approximate state. Note that the term $D_x A_K^H x_{t-H+1}$ decays exponentially with H. If there exists H such that $D_x A_K^H x_{t-H+1} \leq \epsilon_1 1_{kx}, \forall \{w_k \in W\}_{k=0}^T$, then a tightened constraint on the approximate state, i.e.:

$$D_x \tilde{M}_{t-H:t} \leq d_x - \epsilon_1 1_{kx}, \forall \{w_k \in W\}_{k=0}^T \quad 15)$$

With respect to equation 15, some embodiments of the present invention guarantee the original constraint on the true state. The action constraint $u_t \in U$ can similarly be converted to a tightened constraint on the approximate action $\bar{u}_t$, i.e.:

$$D_u \tilde{u}_{t+1} d_u - \epsilon_1 1_{ku}, \forall \{w_k \in W\}_{k=0}^T \quad 16)$$

With respect to equation 16, some embodiments of the present invention require $D_u(-KA_K^H x_{t-H}) \leq \epsilon_1 1_{ku}$ for any disturbances.

Some embodiments of the present invention reformulate the robust constraints on $\tilde{x}_{t+1}$ and $\bar{u}_t$ as polytopic constraints on policy parameters $M_{t-H:t}$ based on the robust optimization techniques. Firstly, some embodiments of the present invention consider the ith row of the constraint $D_{x,i}^T \tilde{x}_{t+1} \leq d_{x,i} - \epsilon_1 \forall \{w_k \in W\}_{k=0}^T$, where $D_{x,i}^T$ denotes the ith row of the matrix $D_x$. Note that this constraint is equivalent to $\sup_{\{w_k \in W\}_{k=0}^T} (D_{x,i}^T \tilde{x}_{t+1}) \leq d_{x,i} - \epsilon_1$. Further, by the definitions of $\tilde{x}_{t+1}$ and W, some embodiments of the present invention obtain the following:

$$\sup_{\{w_k \in W\}} D_{x,i}^T \tilde{x}_{t+1} = \sup_{\{w_k \in W\}} D_{x,i}^T \sum_{s=1}^{2H} \Phi^x_s(M_{t-H+1:t}) w_{t+1-s} \quad 17)$$

-continued $$= \sum_{s=1}^{2H} \sup_{w_{t+1-s} \in W} D_{x,i}^T \Phi_s^x (M_{t-H+1:t}) w_{t+1-s}$$

$$= \sum_{s=1}^{2H} \|D_{x,i}^T \Phi_s^x (M_{t-H+1:t})\|_1 \overline{w}$$

Define $$g_i^x(M_{t-H+1:t}) = \sum_{S=1}^{2H} \|D_{x,i}^T \Phi_s^x (M_{t-H+1:t})\|_1 \overline{w}.$$

Hence, the robust constraint on $\tilde{x}_{t+1}$ is equivalent to the following polytopic constraints on $M_{t-H+1:t}$:

$$g_i^x(M_{t-H+1:t}) \leq d_{x,i} - \epsilon_1, \forall 1 \leq i \leq k_x \quad (18)$$

Similarly, the constraint on $\tilde{u}_t$ is equivalent to:

$$g_j^u(M_{t-H+1:t}) \leq d_{u,j} - \epsilon_1, \forall 1 \leq j \leq k_u$$

where $$g_j^u(M_{t-H+1:t}) = \sum_{s=1}^{2H} \|D_{u,j}^T \Phi_s^u (M_{t-H+1:t})\|_1 \overline{w}.$$

Some embodiments of the present invention convert the constrained online optimal control problem to OCO with memory and temporal-coupled constraints. That is, at each stage t, the decision maker selects a policy $M_t$ satisfying equations (18) and (19), and then incurs a cost $f_t(M_{t-H:t})$ The equations (18) and (19) and the cost function $f_t(M_{t-H:t})$ couple the current policy with the historical policies. This makes the problem far more challenging than OCO with memory which only considers coupled costs.

Some embodiments of the present invention approximate the coupled constraint functions $g_i^x(M_{t-H+1:t})$ and $g_j^u(M_{t-H+1:t})$ as decoupled ones by letting the historical policies ($M_{t-H:t-1}$) be identical to the current $M_t$. If the online policy $M_t$ varies slowly with t, which is satisfied by most OCO algorithms with a diminishing step size, one may be able to bound the approximation errors by $g_i^x(M_{t-H+1:t}) - \dot{g}_i^x(M_t) \leq \epsilon_2$ and $g_j^u(M_{t-H:t}) - \dot{g}_j^u(M_t) \leq \epsilon_2$ for a small $\epsilon_2 > 0$. Thus, equations (18) and (19) are ensured by the polytopic constraints on $M_t$:

$$\dot{g}_i^x(M_t) \leq d_{x,i} - \epsilon_1 - \epsilon_2, \dot{g}_j^u(M_t) \leq d_{u,j} - \epsilon_1 - \epsilon_2 \quad (20)$$

With respect to equation 20, some embodiments of the present invention uses the buffer zone $\epsilon_2$ to allow for the approximation error caused by neglecting the variation of online policies.

Some embodiments of the present invention define a decoupled search space/constraint set on each policy below:

$$\Omega_\epsilon = M \in \mathcal{M} : \dot{g}_i^x(M) \leq d_{x,i} - \epsilon, \quad (21)$$

$$\forall 1 \leq i \leq k_x, \dot{g}_j^u(M) \leq d_{u,j} - \epsilon, \forall 1 \leq j \leq k_u$$

With respect to equation 21, $\mathcal{M}$ is a bounded convex constraint set defined as $\mathcal{M} = \{M : \|M^{[i]}\|_\infty \leq 2\sqrt{n}k^3(1-\gamma)^{i-1}, \forall 1 \leq i \leq H$. Some embodiments of the present invention ensure that $\Omega_\epsilon$ is a polytope. Notice that $\Omega_\epsilon$ provides buffer zones with size $\epsilon$ to account for the approximation errors $\epsilon_1$ and $\epsilon_2$. Based on $\Omega_\epsilon$, some embodiments of the present invention can further convert the OCO with memory and coupling constraints to a classical OCO problem. That is, at stage t, the agent selects a policy $M_t \in \Omega_\epsilon$, and then suffers a convex stage cost $f_t(M_t)$. Some embodiments of the present invention apply online gradient descent to solve this OCO problem. Some embodiments of the present invention select the step sizes of OGD to be small enough to ensure small approximation errors from the problem conversion and small buffer zones, but also to be large enough to allow online policies to adapt to time-varying environments. The most computationally demanding step at each stage is the projection onto the polytope $\Omega_\epsilon$, which requires solving a quadratic program. Nevertheless, one can reduce the online computational burden via offline computation by leveraging the solution structure of quadratic programs. Some embodiments of the present invention note that other OCO algorithms can be applied to solve this problem too, e.g., online natural gradient.

To ensure safety, safe RL literature usually constructs a safe set for the state, while this paper constructs a safe search space $\Omega_\epsilon$ for the policies directly. Further, safe RL literature may employ unsafe policies occasionally, for example, allows unsafe exploration policies within the safe set and changes to a safe policy on the boundary of the safe set. However, some embodiments of the present invention search space $\Omega_\epsilon$ only contains safe/feasible policies. Despite a smaller policy search space, the OGD-BZ still achieves desirable performance. Nevertheless, when the system is unknown, larger sets of exploration policies may benefit the performance, which is left as future work.

THEORETICAL RESULTS

Some embodiments of the present invention establish the conditions on the parameters of the theoretical results by introducing three quantities $\epsilon_1(H)$, $\epsilon_2(\eta, H)$, $\epsilon_3(H)$. Some embodiments of the present invention note $\epsilon_1(H)$ and $E\epsilon_2(\eta, H)$ bound the approximation errors respectively. $\epsilon_3(H)$ bounds the constraint violation of the disturbance-action policy M(K), where M(K) approximates the standard linear controller $u_t = -Kx$ for any $K \in \mathcal{K}$. Some embodiments of the present invention define $\epsilon_1(H) = c_1 n\sqrt{m}H(1-\gamma)^H$, $\epsilon_2(\eta, H) = c_2 \eta \cdot n^2 \sqrt{m} H^2$, $\epsilon_3(H) = c_3 \sqrt{n}(1-\gamma)^H$ where $c_1$ is polynomial of $\|D_x\|_2, \|D_u\|_2, k, G, k_B, \gamma^{-1}, \overline{w}$, and $c_2, c_3$ are polynomials of $\|D_x\|_\infty, \|D_u\|_\infty, k, k_B$, $$\frac{1}{\gamma},$$

$\overline{w}, G$.

Some embodiments of the present invention consider constant step size $\eta_t = \eta$, $\epsilon \geq 0$, $$H \geq \frac{\log(2k^2)}{\log((1-\gamma)^{-1})}.$$

If the buffer size $\epsilon$ and H satisfy $\epsilon \leq \epsilon_* - \epsilon_1(H) - \epsilon_3(H)$, the set $\Omega_\epsilon$ is non-empty. Further, if $\eta$, $\epsilon$ and H also satisfy $\epsilon \geq \epsilon_1(H) + \epsilon_2(\eta, H)$ the OGD-BS is feasible, i.e. $x_t^{OGD-BZ} \in X$ and $u_t^{OGD-BZ} \in U$ for all t and for any disturbances $\{w_k \in W\}_{k=0}^T$.

Some embodiments of the present invention show that $\epsilon$ should be small enough to ensure a nonempty $\Omega_\epsilon$ and thus valid outputs of OGD-BZ. This is intuitive since the constraints become more conservative as $\epsilon$ increases. Since $\epsilon_1(H) + \epsilon_3(H) = \theta(H(1-\gamma)^H)$ decays with H, the first condition also implicitly requires a large enough H. Some embodiments of the present invention to ensure feasibility, the buffer zone $\epsilon$ should also be large enough to allow for the total approximation errors $\epsilon_1(H)+\epsilon_2(\eta, H)$. To ensure the compatibility of the two conditions on E, the approximation errors $\epsilon_1(H)+\epsilon_2(\eta, H)$ should be small enough, which requires a large enough H and a small enough $\eta$. In conclusion, the feasibility requires a large enough H, a small enough $\eta$, and an $\epsilon$ which is not too large or too small. For example, some embodiments of the present invention can select $$\eta \le \frac{\epsilon_*}{8c_2 n^2 \sqrt{m} H^2}, \frac{\epsilon_*}{4} \le \epsilon \le \frac{3\epsilon_*}{4},$$

$$\text{and } H \ge \max\left(\frac{\log\left(\frac{4(2c_1+c_2)n\sqrt{m}}{\epsilon_*}T\right)}{\log((1-\gamma)^{-1})}, \frac{\log(2k^2)}{\log((1-\gamma)^{-1})}\right).$$

Under the conditions, OGD-BZ enjoys the regret bound by:

$$Reg(OGD-BZ) \le O\left(n^3 mH^3 \eta T + \frac{mn}{\eta} + (1-\gamma)^H H^{2.5} T\left(\frac{n^3 m^{1.5}}{\epsilon^*} + \sqrt{k_c} mn^{2.5}\right) + \epsilon TH^{1.5}\left(\frac{n^2 m}{\epsilon_*} + \sqrt{k_c mn^3}\right)\right) \quad (22)$$

With respect to equation 22, the hidden constant depends polynomially on k, $k_B$, $\gamma^{-1}$, $\|D_x\|_2$, $\|D_u\|_2$, $\|D_x\|_\infty$, $\|D_u\|_\infty$, $\|d_x\|_2$, $\|d_u\|_2$, $\overline{w}$, G. Some embodiments of the present invention provide a regret bound for OGD-BZ as long as OGD-BS is feasible. Notice that as the buffer size $\epsilon$ increases, the regret bound becomes worse. This is intuitive since the OGD-BZ will have to search for policies in a smaller set $\Omega_\epsilon$ if $\epsilon$ increases. Consequently, the buffer size $\epsilon$ can serve as a tuning parameter for the trade-off between safety and regrets, i.e., a small $\epsilon$ is preferred for low regrets while a large $\epsilon$ is preferred for feasibility. In additional, although a small step size $\eta$ for feasibility in equation 22, some embodiments of the present invention suggest that the step size should not be too small for low regrets since the regret bound contains a $\Theta(\eta^{-1})$ term. This is intuitive since the step size $\eta$ should be large enough to allow OGD-BZ to adapt to the varying objectives for better online performance.

Some embodiments of the present invention provide a regret bound with specific parameters. For sufficiently large T, when $$H \ge \frac{\log\left(\frac{4(2c_1+c_2)n\sqrt{m}T}{\epsilon_*}\right)}{\log((1-\gamma)^{-1})}, \eta = \Theta\left(\frac{1}{n^2\sqrt{m}H\sqrt{T}}\right),$$

$$\epsilon = \epsilon_1(H) + \epsilon_2(\eta, H) = \Theta\left(\frac{\log(n\sqrt{m}T)}{\sqrt{T}}\right),$$

OGD-BZ is feasible and $Reg(OGD-BZ) \le \tilde{O}(n^3 m^{1.5} k_c^{0.5} \sqrt{T})$. Some embodiments of the present inventions show that OGD-BZ achieves $\tilde{O}(\sqrt{T})$ regrets when $H \ge \Theta(\log T)$, $$\eta = \Theta\left(\frac{1}{\sqrt{T}}\right) \text{ and } \epsilon = \Theta\left(\frac{1}{\sqrt{T}}\right).$$

This demonstrates that OGD_BZ can ensure both constraint satisfaction and sublinear regrets under proper parameters of the algorithm. Some embodiments of the present invention remark that although a larger H is preferred for better performance, the computational complexity of OGS-BZ increases with H. Besides, though the choices of H, $\eta$, and $\epsilon$ require the prior knowledge of T, one can apply doubling tricks to avoid this requirement. Some embodiments of the present invention not that the $\tilde{O}(\sqrt{T})$ regret bound is consistent with the unconstrained online optimal control literature for convex cost functions. For strongly convex costs, the regret for the unconstrained case is logarithmic in T, and some embodiments of the present invention conjecture that logarithmic regret can also be achieved for the constrained case.

Some embodiments of the present invention establish three lemmas that bound errors by $\epsilon_1(H)$, $\epsilon_2(\eta, H)$ and $\epsilon_3(H)$ respectively. For Lemma 1, when $M_t \in M$ and $$H \ge \frac{\log(2k^2)}{\log((1-\gamma)^{-1}}$$

the present invention has $$\max_{\|w_k\|_\infty \le \overline{w}} \|D_x A_K^H x_{t-H}\|_\infty \le \epsilon_1(H); \max_{\|w_k\|_\infty \le \overline{w}} \|D_{u,j}^T KA_K^H x_{t-H}\|_\infty \le \epsilon_1(H).$$

For Lemma 2, when $$H \ge \frac{\log(2k^2)}{\log((1-\gamma)^{-1}},$$

the policies $\{M_t\}_{t=0}^T$ generated by OGD-BZ with a constant step size $\eta$ satisfy $$\max_{1 \le i \le k_x} |g_i^x(M_t) - g_i^x(M_{t-H+1:t})| \le \epsilon_2(\eta, H);$$

$$\max_{1 \le i \le k_x} |g_j^u(M_t) - g_j^u(M_{t-H+1:t})| \le \epsilon_2(\eta, H).$$

Some embodiments of the present invention show that for any $K \in K$, there exists a disturbance-action policy $M(K) \in M$ to approximate the policy $u_t = -Kx_t$. However, M(K) may not be feasible and is only $\epsilon_3(H)$—loosely feasible. For Lemma 3, there exists a disturbance-action policy $M(K) = \{M^{[i]}(K)\}_{i=1}^H \in M$ defined as $M^{[i]}(K) = (K-K)(A-BK)^{i-1}$ such that max $(\|D_x[x_t^K - x_t^{M(K)}]\|_\infty, \|D_u[u_t^K - u_t^{M(K)}]\|_\infty) \le \epsilon_3(H)$ where $(x_t^K, u_t^K)$ and $(x_t^{M(K)}, u_t^{M(K)})$ are produced by controller $u_t = -Kx_t$ and disturbance-action policy M(K) respectively. Based on Lemma 3, some embodiments of the present invention show that M(K) belongs to a polytopic constraint set.

Some embodiments of the present invention consider $K \in K$, if K is $\epsilon_0$—strictly feasible for $\epsilon_0 \ge 0$, then $M(K) \in \Omega_{\epsilon 0 - \epsilon 1 - \epsilon 3}$. Some embodiments of the present invention prove that $\Omega_\epsilon$ is non-empty by showing that $M(K_*) \in \Omega_{\epsilon_* - \epsilon 1 - \epsilon 3}$. Since the set $\Omega_\epsilon$ becomes smaller as $\epsilon$ increases, when $\epsilon_* - \epsilon_1 - \epsilon_3 \ge \epsilon$, some embodiments of the present invention have $M(K_*) \in \Omega_{\epsilon_* - \epsilon 1 - \epsilon 3} \subseteq \Omega_\epsilon$, which proves that $\Omega_\epsilon$ is non-empty. Some embodiments of the present invention prove the feasibility by Lemma 1 and Lemmas 2.

Specifically, OGD-BZ guarantees that $M_t \in \Omega_\epsilon$ for all t. Thus, by Lemma 2, some embodiments of the present invention have $g_i^x(M_{t-H:t-1}) - \dot{g}_i^x(M_{t-1}) + \dot{g}_i^x(M_{t-1}) \le \epsilon_2 + d_{x,i} - \epsilon$ for any i. Some embodiments of the present invention have $D_{x,i}^T x_t = D_{x,i}^T A_K^H x_{t-H} + D_{x,i}^T$ $\bar{x}_2 \ge \|D_x A_K^H x_{t-H}\|_\infty + g_i^x(M_{t-H:t-1}) \le \epsilon_1 + \epsilon_2 + d_{x,i} - \epsilon \le d_{x,i}$ if $\epsilon \ge \epsilon_1 + \epsilon_2$ for an $\{w_k \in W\}_{k=0}^T$. Therefore, $x_t \in X$ for all $w_k \in W$. Similarly, some embodiments of the present invention can show $u_t \in U$ for any $w_k \in W$. Thus, OGD-BZ is feasible.

Some embodiments of the present invention divide regret into three parts and bound each part $$Reg(OGD-BZ) =$$

$$J_T(A) - \min_{K \in K} J_T(K) = J_T(A) - \sum_{t=0}^T \hat{f}_t(M_t) + \sum_{t=0}^T \hat{f}_t(M_t) -$$

$$\min_{M \in \Omega_\epsilon} \sum_{t=0}^T \hat{f}_t(M) + \min_{M \in \Omega_\epsilon} \sum_{t=0}^T \hat{f}_t(M_t) - \min_{K \in K} J_T(K).$$

For Lemma 4, with a constant step size $$\eta, \sum_{t=0}^T \hat{f}_t(M_t) - \min_{M \in \Omega_\epsilon} \sum_{t=0}^T \hat{f}_t(M) \le \frac{\delta^2}{2\eta} + \eta G_f^2 T/2,$$

where $\delta = sup_{M, \overline{M} \in \Omega_\epsilon} \|M - \overline{M}\|_F \le 4\sqrt{mn}\, k^3/\gamma$ and $G_f =$ $$\max_t sup_{M \in \Omega_\epsilon} \|\nabla \hat{f}_t(M)\|_F \le \Theta\left(\sqrt{n^3 H^3 m}\right).$$

For notational simplicity, some embodiments of the present invention denote $$M^* = \operatorname{argmin}_{\Omega_\epsilon} \sum_{t=0}^T \hat{f}_t(M), \; K^* = \operatorname{argmin}_K J_T(K).$$

By Lemma 3, some embodiments of the present invention construct a loosely feasible $M_{ap} = M(K^*)$ tp approximate $K^*$. Some embodiments of the present invention have the following:

$$M_{ap} \in \Omega_{-\epsilon_1 - \epsilon_3} \quad 23)$$

For Lemma 5, some embodiments of the present invention consider $K^* \in K$ and $M_{ap} = M(K^*)$, then $$\text{Part iii-}A \le \Theta\left((\epsilon_1 + \epsilon_3 + \epsilon)TH^{\frac{3}{2}}\left(\frac{n^2 m}{\epsilon_*} + \sqrt{k_c mn^3}\right)\right).$$

Some embodiments of the present invention highlight that $M_{ap}$ may not belong to $\Omega_\epsilon$ by equation 23. Therefore, even though $M^*$ is optimal in $\Omega_\epsilon$, some embodiments of the present invention can be non-negative and has to be bounded to yield a regret bound. This is different from the unconstrained online control literature, where some embodiments of the present invention are non-positive because $M_{ap} \in M$ and $M^*$ is optimal in the same set M where there are no constraints.

For Lemma 7, apply algorithm 1 with a constant step size $\eta$, then Part i$\le O(Tn^2 mH^2(1-\gamma)^H + n^3 mH^3 \eta T)$. Finally, some embodiments of the present invention can be proved by summing up the bounds on Part i, Part ii, Part iii-A, and Part iii-B in Lemma 4-7 and only explicitly showing the highest order terms.

Some embodiments of the present invention define $$M^\dagger = \operatorname{argmin}_{\Omega_{-\epsilon_1 - \epsilon_3}} \sum_{t=0}^T \hat{f}_t(M).$$

Some embodiments of the present invention have $$\sum_{t=0}^T \hat{f}_t(M_{ap}) \ge \sum_{t=0}^T \hat{f}_t(M^\dagger).$$

Therefore, it suffices to bound $$\sum_{t=0}^T \hat{f}_t(M^*) - \sum_{t=0}^T \hat{f}_t(M^\dagger),$$

which can be viewed as the difference in optimal values when perturbing the feasible set from $\Omega_\epsilon$ to $\Omega_{-\epsilon_1 - \epsilon_3}$. Some embodiments of the present invention establish a perturbation result by leveraging the polytopic structure of $\Omega_\epsilon$ and $\Omega_{-\epsilon_1 - \epsilon_3}$.

Some embodiments of the present invention consider two polytopes $\Omega_1 = \{x: Cx \le h\}$, $\Omega_2 = \{x: Cx \le h - \Delta\}$, where $\Delta_i \ge 0$ for all i. Some embodiments of the present invention consider a convex function f(x) that is L-Lipschitz continuous on $\Omega_1$. If $\Omega_1$ is bounded, i.e. $sup_{x_1, x'_1 \in \Omega_1} \|x_1 - x'_1\|_2 \le \delta_1$ and if $\Omega_2$ is non-empty, i.e. there exists $x' \in \Omega_2$, then $$|\min_{\Omega_1} f(x) - \min_{\Omega_2} f(x)| \le L \frac{\delta_1 \|\Delta\|_\infty}{\min_{i: \Delta_i > 0}(h - Cx)i}. \quad 24)$$

There exists an enlarged polytope $\Gamma_\epsilon = \{\vec{W}: C\vec{W} \le h_\epsilon\}$ that is equivalent to $\Omega_\epsilon$ for any $\epsilon \in R$, where $\vec{W}$ contains elements of M and auxiliary variables (to handle the constraints with absolute values). Further, (i)$\Gamma_{-\epsilon_1 - \epsilon_3}$ is bounded by $\delta_1 = \Theta(\sqrt{m}\sqrt{n} + \epsilon_* \sqrt{k_c})$;

$$\sum_{t=1}^T \hat{f}_t(M) \quad \text{(ii)}$$

is Lipschitz continuous with $L = \Theta T(nH)^{1.5}\sqrt{m}$); (iii) the difference $\Delta$ between $\Gamma_{\epsilon \epsilon}$ and $\Gamma_{-\epsilon_1 - \epsilon_3}$ satisfies $\|\Delta\|_\infty = \epsilon + \epsilon_1 + \epsilon_3$; there exists $\vec{W}^\circ \in \Gamma_\epsilon$ s.t. $\min_{i: \Delta_i > 0} (h_{-\epsilon_1 - \epsilon_3} - C\vec{W}^\circ)_i \ge \epsilon_*$.

CONCLUSION

Some embodiments of the present invention study online optimal control with linear constraints and linear dynamics with random disturbances. Some embodiments of the present invention propose OGD-BZ and show that OGD-BZ can satisfy all the constraints despite disturbances and ensure $\tilde{O}(\sqrt{T})$ policy regret. Some embodiments of the present invention focus on the theoretical results to the supplementary file. There are many interesting future directions, e.g. (i) consider adversarial disturbances, (ii) consider soft constraints, (iii) consider more general disturbances, (iv) consider bandit feedback, (v) reduce unknown system, (vii) consider more general policies than linear policies, (viii) prove logarithmic regrets for strongly convex costs, etc.

Figure 4:
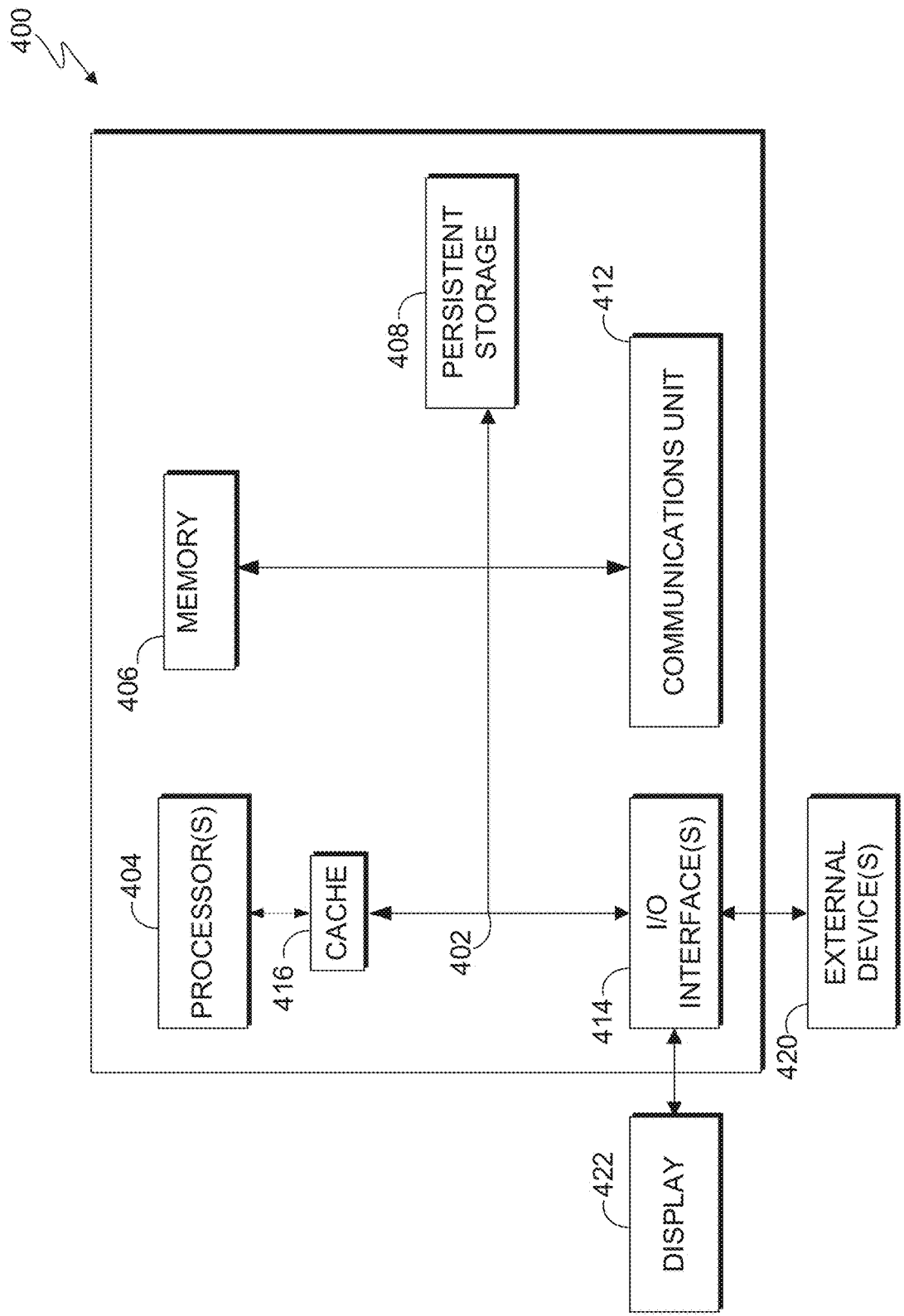
FIG. 4 is a block diagram of an example system, in accordance with an embodiment of the present invention.

FIG. 4 depicts a block diagram of components of computing systems within computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 400 includes communications fabric 402, which provides communications between cache 416, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Control system manager 110 (not shown) may be stored in persistent storage 408 and in memory 606 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. Control system manager 110 may be downloaded to persistent storage 508 through communications unit 412.

I/O interface(s) 414 allows for input and output of data with other devices that may be connected to client computing device and/or server computer. For example, I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, e.g., control system manager 110, can be stored on such portable computer readable storage media and can be loaded onto persistent storage 408 via I/O interface(s) 414. I/O interface(s) 414 also connect to a display 422.

Display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   identifying a plurality of constraints on states of data and actions of data associated with a data model;
   identifying constraints on safety policy parameters associated with a computing device;
   converting the identified constraints into a uniform domain syntax that considers coupled and decoupled constraints;
   introducing buffer data within the converted constraints, wherein the buffer data filters outlier constraints within the plurality of constraints; and
   dynamically generating optimal control policies and optimal safety policies associated with the computing device based on the remaining constraints, wherein the optimal control policies simultaneously minimizes the sum of adversarial varying costs and satisfy constraints despite disturbances by computing a feasibly policy class, computing a safety policy class, and utilizing an optimization tool.

2. The computer-implemented method of claim 1, wherein identifying the plurality of constraints on states of data and actions of data comprises:
   performing a query on an external data source for optimal performance for each state of data;
   storing at least one result of the performed query within a database on the computing device; and
   introducing approximate states and actions that correspond with at least one historical policy associated with the state and action of the data.

3. The computer-implemented method of claim 1, wherein identifying constraints on safety policy parameters comprises receiving preferences of a user associated with the safety policy parameters encompassing the computing device.

4. The computer-implemented method of claim 1, wherein converting the identified constraints comprises:
   using the identified constraints as input data;
   generating a safety policy configuration via a safety translation algorithm; and
   imposing constraints on the approximate states and actions of data that are dynamically translated as constraints on the at least one historical policy using the safety translation algorithm and a policy configuration data model.

5. The computer-implemented method of claim 1, wherein introducing buffer data comprises:
   adding buffer data to the generated safety policy configuration, wherein the buffer data filters outlier constraints within the plurality of constraints and reduce the range of the identified constraints associated with the state and action of data and the safety policy parameters of the computing device.

6. The computer-implemented method of claim 1, wherein dynamically generating optimal safety policies comprises:
   analyzing the generated safety policy configuration;
   generating a parallel subroutine to the generated safety policy configuration;
   predicting the cost output of the estimated data model;
   predicting the utility output of the estimated data model; and
   validating that the generated safety policy configuration does not meet or exceed the upper bounds of the identified constraints associated with the computing device.

7. The computer-implemented method of claim 1, further comprising:
   identifying the constraints associated with the approximate state and action data;
   identifying a temporal-coupled constraints associated with the policy parameters of the computing device; and
   determining the variations associated with the temporal-decoupled online policies.

8. A computer program product comprising:
   one or more computer readable storage media and program instructions stored on the one or more computer readable storage media, the program instructions comprising:
      program instructions to identify a plurality of constraints on states of data and actions of data associated with a data model;
      program instructions to identify constraints on safety policy parameters associated with a computing device;
      program instructions to convert the identified constraints into a uniform domain syntax that considers coupled and decoupled constraints;
      program instructions to introduce buffer data within the converted constraints, wherein the buffer data filters outlier constraints within the plurality of constraints; and
      program instructions to dynamically generate optimal control policies and optimal safety policies associated with the computing device based on the remaining constraints, wherein the optimal control policies simultaneously minimizes the sum of adversarial varying costs and satisfy constraints despite disturbances by computing a feasibly policy class, computing a safety policy class, and utilizing an optimization tool.

9. The computer program product of claim 8, wherein the program instructions to identify the plurality of constraints on states of data and actions of data comprise:
   program instructions to perform a query on an external data source for optimal performance for each state of data;
   program instructions to store at least one result of the performed query within a database on the computing device; and
   program instructions to introduce approximate states and actions that correspond with at least one historical policy associated with the state and action of the data.

10. The computer program product of claim 8, wherein the program instructions to identify constraints on safety policy parameters comprise:
   program instructions to receive preferences of a user associated with the safety policy parameters encompassing the computing device.

11. The computer program product of claim 8, wherein the program instructions to convert the identified constraints comprises:
   program instructions to use the identified constraints as input data;
   program instructions to generate a safety policy configuration via a safety translation algorithm; and
   program instructions to impose constraints on the approximate states and actions of data that are dynamically translated as constraints on the at least one historical policy using the safety translation algorithm and a policy configuration data model.

12. The computer program product of claim 8, wherein the program instructions to introduce buffer data comprises:
   program instructions to add buffer data to the generated safety policy configuration, wherein the buffer data filters outlier constraints within the plurality of constraints and reduce the range of the identified constraints associated with the state and action of data and the safety policy parameters of the computing device.

13. The computer program product of claim 8, wherein the program instructions to dynamically generate optimal safety policies comprise:
   program instructions to analyze the generated safety policy configuration;
   program instructions to generate a parallel subroutine to the generated safety policy configuration;
   program instructions to predict the cost output of the estimated data model;
   program instructions to predict the utility output of the estimated data model; and
   program instructions to validate that the generated safety policy configuration does not meet or exceed the upper bounds of the identified constraints associated with the computing device.

14. The computer-implemented method of claim 8, wherein the program instructions stored on the one or more computer readable storage media further comprise:
   program instructions to identify the constraints associated with the approximate state and action data;
   program instructions to identify a temporal-coupled constraints associated with the policy parameters of the computing device; and
   program instructions to determine the variations associated with the temporal-decoupled online policies.

15. A computer system comprising:
   one or more computer processors;
   one or more computer readable storage media; and
   program instructions stored on the one or more computer readable storage media for execution by at least one of the one or more computer processors, the program instructions comprising:
      program instructions to identify a plurality of constraints on states of data and actions of data associated with a data model;
      program instructions to identify constraints on safety policy parameters associated with a computing device;
      program instructions to convert the identified constraints into a uniform domain syntax that considers coupled and decoupled constraints;
      program instructions to introduce buffer data within the converted constraints, wherein the buffer data filters outlier constraints within the plurality of constraints; and
      program instructions to dynamically generate optimal control policies and optimal safety policies associated with the computing device based on the remaining constraints, wherein the optimal control policies simultaneously minimizes the sum of adversarial varying costs and satisfy constraints despite disturbances by computing a feasibly policy class, computing a safety policy class, and utilizing an optimization tool.

16. The computer system of claim 15, wherein the program instructions to identify the plurality of constraints on states of data and actions of data comprise:
   program instructions to perform a query on an external data source for optimal performance for each state of data;
   program instructions to store at least one result of the performed query within a database on the computing device; and
   program instructions to introduce approximate states and actions that correspond with at least one historical policy associated with the state and action of the data.

17. The computer system of claim 15, wherein the program instructions to identify constraints on safety policy parameters comprise:
   program instructions to receive preferences of a user associated with the safety policy parameters encompassing the computing device.

18. The computer system of claim 15, wherein the program instructions to convert the identified constraints comprises:
   program instructions to use the identified constraints as input data;
   program instructions to generate a safety policy configuration via a safety translation algorithm; and
   program instructions to impose constraints on the approximate states and actions of data that are dynamically translated as constraints on the at least one historical policy using the safety translation algorithm and a policy configuration data model.

19. The computer system of claim 15, wherein the program instructions to introduce buffer data comprises:
   program instructions to add buffer data to the generated safety policy configuration, wherein the buffer data filters outlier constraints within the plurality of constraints and reduce the range of the identified constraints associated with the state and action of data and the safety policy parameters of the computing device.

20. The computer system of claim 15, wherein the program instructions to dynamically generate optimal safety policies comprise:
   program instructions to analyze the generated safety policy configuration;
   program instructions to generate a parallel subroutine to the generated safety policy configuration;
   program instructions to predict the cost output of the estimated data model;
   program instructions to predict the utility output of the estimated data model; and
   program instructions to validate that the generated safety policy configuration does not meet or exceed the upper bounds of the identified constraints associated with the computing device.

* * * * *